UNITED STATES PATENT OFFICE.

JAMES E. TRASK, OF SALEM, MASSACHUSETTS.

BUILDING-CEMENT.

SPECIFICATION forming part of Letters Patent No. 271,950, dated February 6, 1883.

Application filed May 27, 1882. (Specimens.)

*To all whom it may concern:*

Be it known that I, JAMES E. TRASK, of Salem, county of Essex, and State of Massachusetts, have invented a new and useful Building-Cement, of which the following is a full, clear, concise, and exact description.

My cement consists of the following composition, the ingredients of which are combined in the proportions stated: rosin-oil, thirty pounds; crude petroleum, ten pounds; rosin, (pulverized,) twenty-five and one-half pounds; metallic brown, forty-six pounds; Venetian red, forty-one pounds; whiting, thirty-nine pounds; ground slate, thirty-five pounds. One and one-half pound of lamp-black may be added to modify the color produced by the Venetian red. I mix these ingredients as follows: The rosin-oil and petroleum are put into a kettle together, under which a slow fire is burning sufficient to keep the kettle and contents moderately hot. The pulverized rosin is then added, and dissolves in the heated mixture of rosin-oil and petroleum, after which the metallic brown, Venetian red, ground slate, and whiting are added to give weight and proper body to the mass. It is best to add the whiting last, as in this way it is not so apt to lump, and a smoother composition is obtained.

I prefer for the best results to use third-run rosin-oil rather than oil of the first or second runs.

In place of metallic brown and Venetian red, any dry paints of this class may be used as a filling with nearly equal effect, and cements varying in color produced; or, if a white cement is desired, the respective amounts of metallic brown and Venetian red may be replaced by whiting, the whiting and ground slate together making a good filling and producing a good working cement.

I disclaim all that is patented by Letters Patent No. 117,647, of August 1, 1871, granted to T. J. Langley, and by Letters Patent No. 179,829, of July 11, 1876, granted to C. M. Warren.

I claim—

The cement above described, consisting of rosin-oil, crude petroleum, and rosin, mixed as specified, and filled with dry paints, whiting, and ground slate, as and in the proportions specified.

JAMES E. TRASK.

Witnesses:
WM. A. MACLEOD,
ROBERT WALLACE.